United States Patent
Yatsu

(10) Patent No.: US 9,707,493 B2
(45) Date of Patent: Jul. 18, 2017

(54) COLD TRAP

(71) Applicant: Sumitomo Heavy Industries, Ltd., Tokyo (JP)

(72) Inventor: Takahiro Yatsu, Tokyo (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 127 days.

(21) Appl. No.: 14/556,699

(22) Filed: Dec. 1, 2014

(65) Prior Publication Data

US 2015/0151216 A1   Jun. 4, 2015

(30) Foreign Application Priority Data

Dec. 2, 2013   (JP) ................................ 2013-249352

(51) Int. Cl.
| | |
|---|---|
| *F04B 37/08* | (2006.01) |
| *F04D 19/04* | (2006.01) |
| *F04B 37/16* | (2006.01) |
| *B01D 8/00* | (2006.01) |
| *F04B 37/02* | (2006.01) |
| *F04B 37/14* | (2006.01) |

(52) U.S. Cl.
CPC ............. *B01D 8/00* (2013.01); *F04B 37/02* (2013.01); *F04B 37/14* (2013.01)

(58) Field of Classification Search
CPC . B01D 8/00; F04B 37/08; F04B 37/02; F04B 37/14; F04B 37/16; F04D 19/04; C23C 14/564; C23C 16/4412; Y10S 55/15
See application file for complete search history.

(56) References Cited

U.S. PATENT DOCUMENTS

| | | | | |
|---|---|---|---|---|
| 5,259,735 A | * | 11/1993 | Takahashi | B01D 8/00 417/203 |
| 6,051,053 A | * | 4/2000 | Noji | B01D 8/00 95/133 |
| 6,368,371 B1 | * | 4/2002 | Nomura | B01D 45/08 55/309 |
| 6,464,466 B1 | * | 10/2002 | Nomura | C23C 16/4412 417/48 |

(Continued)

FOREIGN PATENT DOCUMENTS

| | | | |
|---|---|---|---|
| CN | 2683225 | * | 9/2005 |
| JP | S55-109800 A | | 8/1980 |

(Continued)

OTHER PUBLICATIONS

"Machine Translation of JP05018602 U, Feb. 1993".*
"Machine Translation of CN 2683225, Ji Liming, Sep. 2005".*

*Primary Examiner* — Frantz Jules
*Assistant Examiner* — Martha Tadesse
(74) *Attorney, Agent, or Firm* — Michael Best & Friedrich LLP

(57) ABSTRACT

In a cold trap provided between a vacuum chamber and a vacuum pump for the vacuum chamber, a cold panel is located in an exhaust passage from an exhaust port of the vacuum chamber to an intake port of the vacuum pump. A cold panel chamber includes an entrance that connects the exhaust passage to the exhaust port of the vacuum chamber, and an exit that connects the exhaust passage to the intake port of the vacuum pump. The exit is provided so as to be eccentric with respect to the entrance.

18 Claims, 2 Drawing Sheets

26

(56) References Cited

U.S. PATENT DOCUMENTS

| | | | |
|---|---|---|---|
| 6,553,811 B2 * | 4/2003 | Nomura | B01D 8/00 73/46 |
| 6,554,879 B1 * | 4/2003 | Nomura | B01D 8/00 55/385.1 |
| 7,217,306 B2 * | 5/2007 | Nomura | B01D 8/00 55/309 |
| 7,343,695 B2 * | 3/2008 | Miyakawa | F26B 5/04 34/524 |
| 7,992,394 B2 | 8/2011 | Oikawa | |
| 8,572,988 B2 * | 11/2013 | Tanaka | B01D 8/00 62/55.5 |
| 8,800,303 B2 * | 8/2014 | Oikawa | B01D 8/00 417/901 |
| 9,180,385 B2 * | 11/2015 | Tanaka | B01D 8/00 |
| 2007/0144185 A1 * | 6/2007 | Tanaka | F04B 37/08 62/55.5 |
| 2009/0107154 A1 * | 4/2009 | Horiuchi | B01D 53/265 62/55.5 |
| 2009/0266088 A1 * | 10/2009 | Oikawa | B01D 8/00 62/55.5 |
| 2010/0011783 A1 * | 1/2010 | Aoki | F04B 37/08 62/55.5 |
| 2010/0012292 A1 * | 1/2010 | Yamazaki | H01L 21/67017 165/61 |
| 2013/0192277 A1 * | 8/2013 | Tanaka | B01D 8/00 62/55.5 |

FOREIGN PATENT DOCUMENTS

| | | | |
|---|---|---|---|
| JP | 05-018602 | * | 2/1993 |
| JP | H11-294379 A | | 10/1999 |
| JP | 2001-107858 A | | 4/2001 |
| JP | 2009-262083 A | | 11/2009 |
| KR | 1996-0003788 | | 3/1996 |
| KR | 20110033655 A | | 3/2011 |

* cited by examiner

COLD TRAP

RELATED APPLICATION

Priority is claimed to Japanese Patent Application No. 2013-249352, filed on Dec. 2, 2013, the entire content of which is incorporated herein by reference.

BACKGROUND OF THE INVENTION

1. Field of the Invention

The present invention relates to a cold trap.

2. Description of the Related Art

There is a cold trap provided between a vacuum chamber and a vacuum pump, which is referred to as an in-line type cold trap. A cold panel is placed in an exhaust passage connecting an exhaust port of the vacuum chamber and an intake port of the vacuum pump. The vacuum pump may be a turbo molecular pump. When the in-line type cold trap is used in combination with the turbo molecular pump, the cold trap is primarily used to pump water vapor.

Cold traps of in-line type are generally grouped into two subcategories depending on the thickness in the direction of the exhaust passage. One is a cold trap of thin type and the other is a cold trap of thick type. The cold trap of thin type is implemented by a planar cold panel such as a baffle or a perforated plate. The cold trap of thick type is implemented by, for example, a cold panel of a barrel form having a surface extending in the direction of the exhaust passage.

Assuming that the cold trap of thick type has the same diameter as the cold trap of thin type, the cold trap of thick type normally has a larger surface area. For this reason, the thick cold trap is more advantageous than the thin cold trap in terms of the pumping speed. Further, the thick cold trap is more advantageous in terms of the conductance of the exhaust passage. However, the thin cold trap is planar and so occupies a large portion of the cross section of the exhaust passage to decrease the conductance thereof. Therefore, as compared to the thin cold trap, the thick cold trap is more advantageous in terms of the pumping speed of the downstream vacuum pump (e.g., a turbo molecular pump).

A suitable application of the thin cold trap is found in a case where an installation space for the thin cold trap is small. For example, a vacuum pump may be required to be installed at a location displaced with respect to the exhaust port of the vacuum chamber in a transversal direction (i.e., in a direction perpendicular to the exhaust passage). In this case, the intake port flange of the vacuum pump is eccentric with respect to the exhaust port flange of the vacuum chamber so that a conversion flange for converting the transversal position is interposed between the exhaust port flange and the intake port flange. Since an inherently narrow space between the vacuum chamber and the vacuum pump is shared by the conversion flange and the cold trap, the installation space available for the cold trap is particularly small.

SUMMARY OF THE INVENTION

An embodiment of the present invention addresses a need to fit a cold trap of in-line type having a relatively large pumping capability to a narrow installation space.

According to an embodiment of the present invention, there is provided a cold trap provided between a vacuum chamber and a vacuum pump for the vacuum chamber. The cold trap includes a cold panel located in an exhaust passage from an exhaust port of the vacuum chamber to an intake port of the vacuum pump, and a cold panel chamber including an entrance that connects the exhaust passage to the exhaust port of the vacuum chamber, and an exit that connects the exhaust passage to the intake port of the vacuum pump. The exit is provided so as to be eccentric with respect to the entrance.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

A detailed description of an embodiment to implement the present invention will be given with reference to the drawings. Like numerals are used in the description to denote like elements and the description may be omitted as appropriate. The structure described below is by way of example only and does not limit the scope of the present invention.

Figure 1:
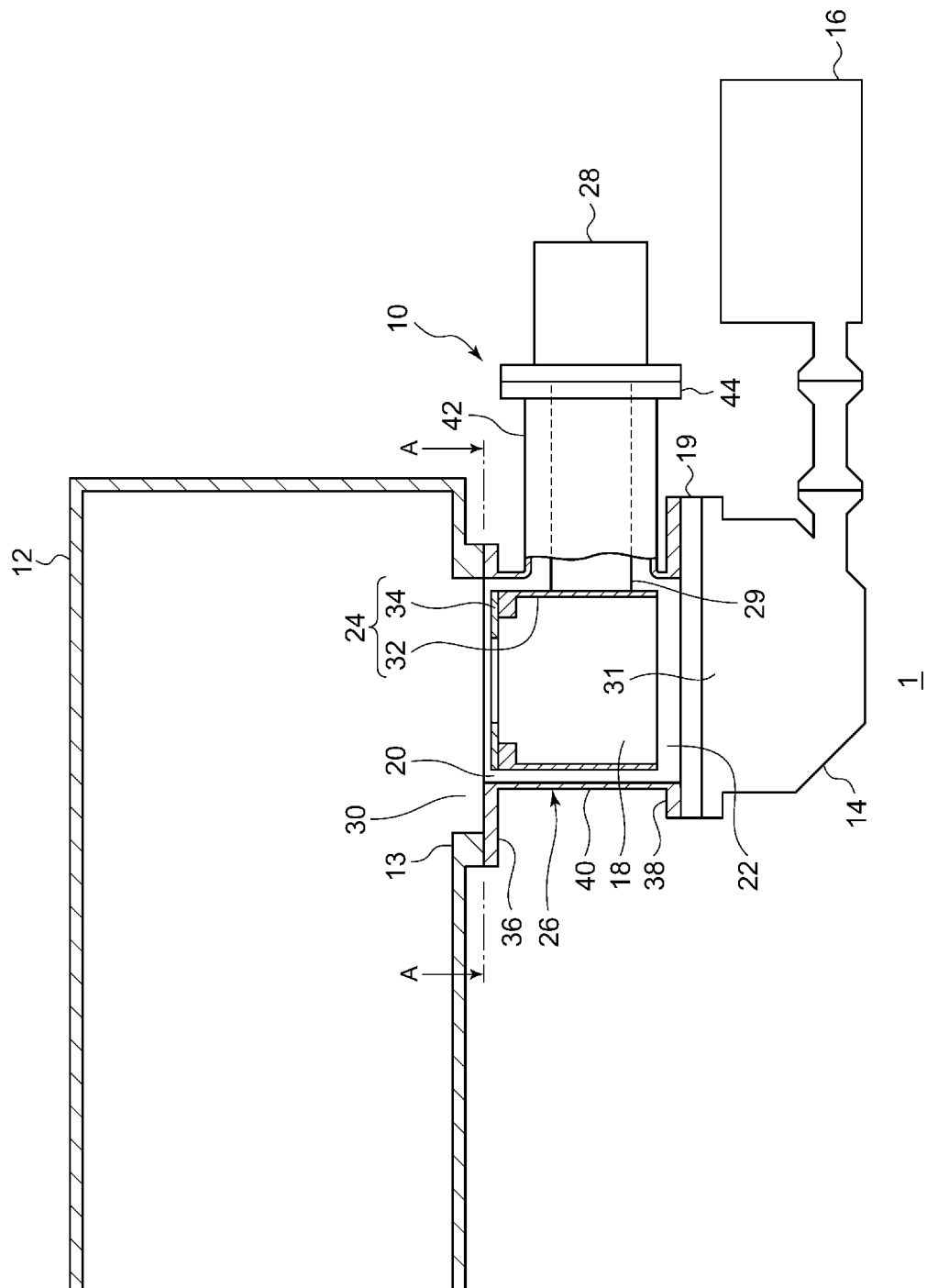
FIG. 1 is a schematic cross sectional view of a vacuum pumping system according to an embodiment of the present invention.

FIG. 1 is a schematic cross sectional view of a vacuum pumping system 1 according to an embodiment of the present invention. The vacuum pumping system 1 includes a cold trap 10 and a main vacuum pump (e.g., a turbo molecular pump 14) for evacuating a volume to be evacuated (e.g., a vacuum chamber 12 of a vacuum processing apparatus). The main vacuum pump is a high vacuum pump for evacuating the volume to a high vacuum range. The main vacuum pump is provided in a stage subsequent to the cold trap 10. The main vacuum pump may be a diffusion pump.

In addition to the main vacuum pump, the vacuum pumping system 1 includes an auxiliary pump 16 for rough pumping of the vacuum chamber 12. The auxiliary pump 16 is provided in a stage subsequent to the main vacuum pump. For example, the auxiliary pump 16 is a dry pump.

The turbo molecular pump 14 is connected to the vacuum chamber 12 via an exhaust passage 18. The cold trap 10 is placed between the vacuum chamber 12 and the turbo molecular pump 14. The cold trap 10 is of so-called in-line type. For example, the cold trap 10 is placed above the turbo molecular pump 14 in the vertical direction.

The exhaust passage 18 is a space for guiding a gas from the vacuum chamber 12 to the turbo molecular pump 14. Therefore, the exhaust passage 18 includes an inlet opening 20 toward the vacuum chamber 12 and an outlet opening 22 toward the turbo molecular pump 14. The gas to be pumped enters the exhaust passage 18 from the vacuum chamber 12 via the inlet opening 20 and flows to the turbo molecular pump 14 via the outlet opening 22.

The vacuum pumping system 1 includes a gate valve 19 between the cold trap 10 and an intake port 31 of the turbo molecular pump 14. The gate valve 19 is adjacent to the cold trap 10 below the outlet opening 22. By opening the gate valve 19, the turbo molecular pump 14 is connected to the vacuum chamber 12. By closing the gate valve 19, the turbo molecular pump 14 is disconnected from the vacuum chamber 12. For example, the gate valve 19 is normally closed when the cold trap is regenerated.

The cold trap 10 includes a cold panel 24, a cold panel chamber 26 surrounding the cold panel 24, and a refrigerator 28 for cooling the cold panel 24. The cold panel 24 is placed in the exhaust passage 18 from an exhaust port 30 of the vacuum chamber 12 to the intake port 31 of the turbo molecular pump 14. The cold panel chamber 26 is configured to connect the exhaust port 30 of the vacuum chamber 12 to the gate valve 19.

The cold panel 24 is configured to capture the gas on its surface by condensation. The entirety of the cold panel 24 is exposed in the exhaust passage 18. The cold panel 24 is cooled by the refrigerator 28 so as to freeze and capture on its surface a portion of the gas in the exhaust passage 18.

The cold panel 24 has a barrel or cylindrical form so as to surround the central axis of the exhaust passage 18. The cold panel 24 includes a panel body 32 and an expansion panel 34. The expansion panel 34 is located between the exhaust port 30 of the vacuum chamber 12 and the panel body 32 in the axial direction. The expansion panel 34 and the panel body 32 may be referred to as an upper panel and a lower panel, respectively.

The panel body 32 is a barrel or cylindrical portion of the cold panel 24 and has, for example, a circular cylindrical form. The panel body 32 extends from the inlet opening 20 to the outlet opening 22. Thus, the cold panel 24 has a cold panel surface that extends parallel to the flow in the exhaust passage 18. The barrel form helps maintain the conductance of the exhaust passage 18 and achieve a high pumping speed.

The expansion panel 34 is an inward extension of the cold panel 24. The expansion panel 34 extends from the peripheral region of the exhaust passage 18 toward the center region of the exhaust passage 18 such that the center region of the exhaust passage 18 is open. For example, the expansion panel 34 is a circular plate having an opening at the center. The expansion panel 34 is mounted to the upper end of the panel body 32 so as to be coaxial with the panel body 32. The expansion panel 34 helps increase the pumping speed of the cold trap 10.

The cold panel chamber 26 includes an entrance that connects the exhaust passage 18 to the exhaust port 30 of the vacuum chamber 12 and an exit that connects the exhaust passage 18 to the intake port 31 of the turbo molecular pump 14. The exit connects the gate valve 19 to the exhaust passage 18. Thus, by placing the gate valve 19 between the turbo molecular pump 14 and the cold trap 10, the liquefied material (e.g., water) produced during regeneration of the cold trap 10 is blocked by the gate valve 19 from entering the turbo molecular pump 14.

The exit of the cold panel chamber 26 is provided so as to be eccentric with respect to the entrance of the cold panel chamber 26. Details will be described below. In this embodiment, the exit of the cold panel chamber 26 is provided so as to be eccentric with respect to the entrance of the cold trap 10 such that the exit is displaced from the exhaust port 30 of the vacuum chamber 12 toward the periphery of the vacuum chamber 12, in a state in which the cold trap 10 is mounted to the vacuum chamber 12. The exhaust port 30 is located at the center part on a wall surface of the vacuum chamber 12. The turbo molecular pump 14 is provided at a location somewhat displaced from the exhaust port 30 toward the periphery of the wall surface. In this way, interference can be avoided between the turbo molecular pump 14 and another component associated with the vacuum chamber 12 that may be installed closer to the center of the vacuum chamber 12.

The entrance of the cold panel chamber 26 includes an inlet flange 36 for mounting the cold panel chamber 26 to the vacuum chamber 12 (or to the first element adjacent to the entrance of the cold trap 10). The exit of the cold panel chamber 26 includes an outlet flange 38 for mounting the cold panel chamber 26 to the second element (i.e., the gate valve 19) adjacent to the exit of the cold trap 10. The inlet flange 36 and the outlet flange 38 are vacuum flanges. The inlet flange 36 and the outlet flange 38 have the same diameter.

The cold panel chamber 26 also includes a body part 40. The body part 40 is a conduit that surrounds the exhaust passage 18. The body part 40 has a diameter which is constant in the direction of its extension. The panel body 32 is placed so as to create a radial gap from the interior surface of the body part 40. The panel body 32 extends to the neighborhood of the outlet flange 38 along the body part 40. The expansion panel 34 is placed so as to create a radial gap from the inner circumferential surface of the inlet flange 36.

This produces a double tubular structure in which the cold panel 24 is an inner tube and the body part 40 is an outer tube. An annular space is formed between the cold panel 24 and the body part 40. The interior space of the cold panel 24 is a main passage that allows a majority of the exhaust gas to flow through. The annular space is an auxiliary passage for the exhaust gas. Thus, the exhaust passage 18 is partitioned into the main passage and the auxiliary passage.

The outlet flange 38 is provided at a distance from the inlet flange 36 in the direction of extension of the body part 40 (in the vertical direction in FIG. 1). In other words, the inlet flange 36 and the outlet flange 38 are spaced away from each other in the axial direction, the body part 40 connecting the two flanges. The inlet opening 20 is formed in the inlet flange 36 and the outlet opening 22 is formed in the outlet flange 38. The inlet flange 36 is mounted to an exhaust port flange 13 of the vacuum chamber 12, and the outlet flange 38 is mounted to a flange (not shown) of the gate valve 19.

Instead of directly mounting the vacuum chamber 12 to the cold trap 10, another element (e.g., the gate valve 19) may be provided between the cold trap 10 and the vacuum chamber 12. In this case, the inlet flange 36 is mounted to that element adjacent to the cold trap. Instead of mounting the turbo molecular pump 14 to the cold trap 10 via a separate element like the gate valve 19, the cold trap 10 may be directly mounted to the turbo molecular pump 14. In this case, the outlet flange 38 is mounted to the intake port flange of the turbo molecular pump 14.

The cold panel 24 is mounted to the cooling stage 29 of the refrigerator 28. Alternatively, the cold panel 24 may be thermally coupled to the cooling stage 29 of the refrigerator 28 by a heat transfer member coupling the cooling stage 29 of the refrigerator 28 to the cold panel 24. For example, the refrigerator 28 may be a Gifford-McMahon type refrigerator (so-called GM refrigerator). The refrigerator 28 is a single stage refrigerator.

The panel body 32 is thermally coupled to the refrigerator 28. The expansion panel 34 is thermally coupled to the refrigerator 28 via the panel body 32. Alternatively, the panel body 32 and the expansion panel 34 may be thermally coupled to the refrigerator 28 via individual heat transfer passages. In this case, the expansion panel 34 may be coupled to the refrigerator 28 bypassing the panel body 32.

The body part 40 includes a refrigerator housing 42 for accommodating the refrigerator 28 between the inlet flange 36 and the outlet flange 38. The refrigerator housing 42 forms a part of the cold panel chamber 26. A lateral opening for connecting the cold panel 24 to the refrigerator 28 is formed on the lateral side of the body part 40. The refrigerator housing 42, which surrounds at least a portion of the refrigerator 28, extends radially outward from the circumference of the lateral opening. A refrigerator mount flange 44 is formed at the end of the refrigerator housing 42, and the refrigerator 28 is mounted to the refrigerator mount flange 44.

In the pumping process performed by the vacuum pumping system 1 shown in FIG. 1, the vacuum chamber 12 is evacuated and the degree of vacuum is increased to a desired level by opening the gate valve 19 and operating the turbo molecular pump 14. The vacuum chamber 12 may be evacuated by the auxiliary pump 16 for rough pumping before operating the turbo molecular pump 14. The cold trap 10 is cooled to a temperature (e.g., 100 K) at which water vapor flowing through the exhaust passage 18 can be captured. Generally, the turbo molecular pump 14 can discharge water vapor at a relatively low pumping speed. By using the cold trap 10 in combination with the turbo molecular pump 14, a high pumping speed is achieved.

Figure 2:
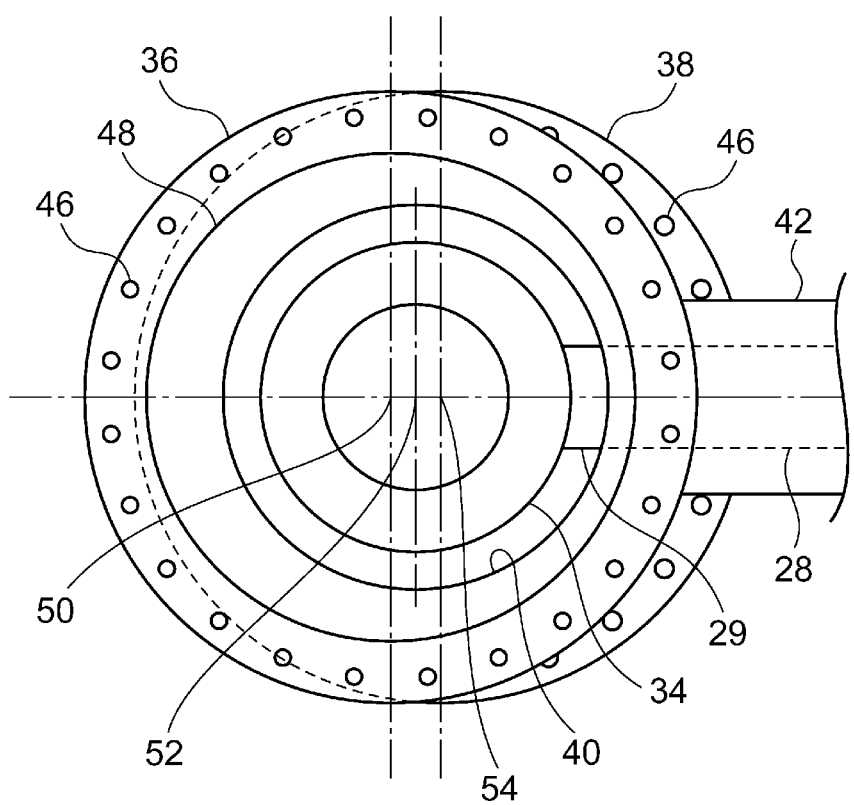
FIG. 2 is a schematic view of a cold panel chamber according to an embodiment of the present invention.

FIG. 2 is a schematic view of the cold panel chamber 26 according to an embodiment of the present invention. FIG. 2 shows a view on arrows A of FIG. 1. As shown in the figure, the inlet flange 36 includes a plurality of mount bolt holes 46 and a vacuum seal 48 on the flange surface. The mount bolt holes 46 are arranged in a circle at the outer circumference of the inlet flange 36. The vacuum seal 48 is between the mount bolt holes 46 and the body part 40 in the radial direction. The outlet flange 38 similarly includes mount bolt holes 46 and a vacuum seal.

FIG. 2 shows an inlet center 50 defined at the center of the inlet flange 36, an opening center 52 defined at the center of the body part 40, and an outlet center 54 defined at the center of the outlet flange 38. The body part 40 is provided so as to be eccentric with respect to the inlet flange 36. The outlet flange 38 is provided so as to be eccentric with respect to the body part 40. Therefore, the inlet center 50, the opening center 52, and the outlet center 54 are located at mutually different positions as shown in the figure. In this embodiment, the inlet center 50, the opening center 52, and the outlet center 54 are linearly arranged in the stated order along the axial line of the refrigerator housing 42 (i.e., the axial line of the refrigerator 28). The opening center 52 is located at the midpoint of the line segment connecting the inlet center 50 and the outlet center 54.

This ensures a relatively large diameter of the cold trap 10. Assuming that the inlet center 50 (or the outlet center 54) is aligned with the opening center 52, the diameter of the cold trap 10 will be smaller than that of the embodiment. The cold trap 10 having a large diameter contributes to an improved pumping performance of the vacuum pumping system 1. For example, a large-sized cold panel 24 may be employed. Further, such a large cold trap provides a higher conductance of the exhaust passage 18 and thereby the pumping speed of the turbo molecular pump 14 is increased.

According to the embodiment, the exit of the cold trap 10 is provided so as to be eccentric with respect to the entrance of the cold trap 10. In other words, the inlet flange 36 is provided so as to be eccentric with respect to the outlet flange 38. This provides the cold trap 10 itself with the function of a transversal conversion flange. Thus, the cold trap 10 can be placed between the vacuum chamber 12 and the turbo molecular pump 14 instead of installing a thin, planer cold trap into the space between the vacuum chamber (or the vacuum pump) and a separate conversion flange as in the related art. The cold trap 10 has the barrel cold panel 24 which is thicker in the direction of flow. The cold trap 10 configured as described above is superior in respect of pumping speed and conductance. Thus, the cold trap 10 of in-line type having a high exhaust capability can be fitted to a narrow space.

For example, using the cold trap 10 having a given nominal diameter (e.g., 8 inch) according to the embodiment can maintain the same level of conductance with providing the area of cold panel about twice as large as a conventional combination of a thin cold trap and a conversion flange having the same nominal diameter.

In this specification, terms like "axial direction" (or "axially") and "radial direction" (or "radially") are used to facilitate the understanding of the relative positions of constituting elements. The axial direction represents a direction that extends along the exhaust passage 18 (or the direction of extension of the body part 40), and the radial direction represents a direction perpendicular to the axial direction. For ease of understanding, relative closeness to the vacuum chamber 12 in the axial direction may be referred to as "above" and relative remoteness may be referred to as "below". In other words, relative remoteness from the turbo molecular pump 14 may be referred to as "above" and relative closeness may be referred to as "below". Closeness to the center of the exhaust passage 18 in the radial direction may be referred to as "inward" and remoteness from the center of the exhaust passage 18 may be referred to as "outward". These expressions are irrelevant to the actual layout occurring when the cold trap 10 is mounted to the vacuum chamber 12 and the turbo molecular pump 14. For example, the cold trap 10 may be mounted to the vacuum chamber 12 such that the outlet opening 22 faces up in the vertical direction and the inlet opening 20 faces down in the vertical direction.

Described above is an explanation based on an exemplary embodiment. The invention is not limited to the embodiment described above and it will be obvious to those skilled in the art that various design changes and variations are possible and that such modifications are also within the scope of the present invention.

The cold panel 24 according to the embodiment is formed of the panel body 32 and the expansion panel 34. Alternatively, various forms of the cold panel 24 are possible. For example, an additional cold panel (e.g., at least one flat panel extending along the direction of flow) may be provided inside the panel body 32. The cold panel 24 may have a form of rectangular cylinder instead of a circular cylinder. Alternatively, the cold panel 24 may include a planar cold panel such as a baffle or a perforated plate.

It should be understood that the invention is not limited to the above-described embodiment, but may be modified into various forms on the basis of the spirit of the invention. Additionally, the modifications are included in the scope of the invention.

What is claimed is:
1. A cold trap provided between a vacuum chamber and a vacuum pump for the vacuum chamber, comprising:
    a cold panel located in an exhaust passage from an exhaust port of the vacuum chamber to an intake port of the vacuum pump, the exhaust passage extending from an inlet opening to an outlet opening of the exhaust passage; and a cold panel chamber comprising an entrance that connects the exhaust passage to the exhaust port of the vacuum chamber, the entrance comprising an inlet flange for mounting the cold panel chamber to the vacuum chamber to the cold trap, and an exit that connects the exhaust passage to the intake port of the vacuum pump, the exit comprising an outlet flange for mounting the cold panel chamber to the vacuum pump to the cold trap, wherein the inlet opening is formed in the inlet flange such that the inlet opening is eccentric with respect to the inlet flange center and the outlet opening is formed in the outlet flange such that the outlet opening is eccentric with respect to the outlet flange.

2. The cold trap according to claim 1, wherein the cold panel has a barrel or cylindrical form surrounding a central axis of the exhaust passage.

3. The cold trap according to claim 1, wherein the cold panel comprises an extension that extends from a peripheral region of the exhaust passage toward a center region of the exhaust passage such that the center region of the exhaust passage is open.

4. The cold trap according to claim 1, wherein the exit connects the exhaust passage to a gate valve provided between the cold trap and the intake port of the vacuum pump.

5. The cold trap according to claim 1, wherein the vacuum pump is a turbo molecular pump.

6. The cold trap according to claim 1, wherein the exit is provided so as to be eccentric with respect to the entrance such that the exit is displaced from the exhaust port of the vacuum chamber toward a periphery of the vacuum chamber, in a state in which the cold trap is mounted to the vacuum chamber.

7. The cold trap according to claim 1,
wherein the cold panel chamber comprises a body part that connects the inlet flange and the outlet flange,
wherein the body part is provided so as to be eccentric with respect to the inlet flange, and the outlet flange is provided so as to be eccentric with respect to the body part.

8. The cold trap according to claim 1, wherein the inlet opening and the outlet opening are aligned with an exhaust passage's central axis.

9. The cold trap according to claim 8, wherein, as viewed along the exhaust passage's central axis, the inlet flange, the exhaust passage's central axis and the outlet flange are located at different positions and linearly arranged along a direction perpendicular to the exhaust passage's central axis.

10. The cold trap according to claim 9, wherein, the exhaust passage's central axis is located between the inlet flange and the outlet flange.

11. The cold trap according to claim 8, further comprising a refrigerator thermally coupled to the cold panel to cool the cold panel, an axial line of the refrigerator being perpendicular to the exhaust passage's central axis,
wherein, as viewed along the exhaust passage's central axis, the inlet flange, the exhaust passage's central axis and the outlet flange are linearly arranged along the axial line of the refrigerator.

12. The cold trap according to claim 8, wherein, as viewed along the exhaust passage's central axis, the inlet flange and the outlet flange are displaced from each other in a direction perpendicular to the exhaust passage's central axis and the inlet flange and the outlet flange are arranged such as to partially overlap each other.

13. A cold trap provided between a vacuum chamber and a vacuum pump for the vacuum chamber, comprising:
a cold panel located in an exhaust passage from an exhaust port of the vacuum chamber to an intake port of the vacuum pump, the exhaust passage extending in a cold trap's axial direction; and
a cold panel chamber comprising an entrance that connects the exhaust passage to the exhaust port of the vacuum chamber, the entrance comprising an inlet flange for mounting the cold panel chamber to the vacuum chamber to the cold trap, and an exit that connects the exhaust passage to the intake port of the vacuum pump, the exit comprising an outlet flange for mounting the cold panel chamber to the vacuum pump to the cold trap,
wherein the exit is provided so as to be eccentric with respect to the entrance,
wherein, as viewed in the cold trap's axial direction, a center of the inlet flange and a center of the outlet flange are displaced from each other in a direction perpendicular to the cold trap's axial direction and the inlet flange and the outlet flange are arranged such as to partially overlap each other.

14. The cold trap according to claim 13, wherein, as viewed in the cold trap's axial direction, the center of the inlet flange, a center of the exhaust passage and the center of the outlet flange are located at different positions and linearly arranged in the direction perpendicular to the cold trap's axial direction.

15. The cold trap according to claim 14, wherein the center of the exhaust passage is located on a line segment connecting the center of the inlet flange and the center of the outlet flange.

16. The cold trap according to claim 13, further comprising a refrigerator thermally coupled to the cold panel to cool the cold panel, an axial line of the refrigerator being perpendicular to the cold trap's axial direction,
wherein, as viewed in the cold trap's axial direction, the center of the inlet flange, a center of the exhaust passage and the center of the outlet flange are linearly arranged along the axial line of the refrigerator.

17. The cold trap according to claim 1, wherein the inlet flange is for mounting the cold panel chamber to a gate valve provided between the cold trap and the vacuum chamber, and/or the outlet flange is for mounting the cold panel chamber to a gate valve provided between the cold trap and the vacuum pump.

18. The cold trap according to claim 13, wherein the inlet flange is for mounting the cold panel chamber to a gate valve provided between the cold trap and the vacuum chamber, and/or the outlet flange is for mounting the cold panel chamber to a gate valve provided between the cold trap and the vacuum pump.

* * * * *